United States Patent
Arnott et al.

(10) Patent No.: US 9,713,945 B1
(45) Date of Patent: Jul. 25, 2017

(54) MOTOR VEHICLE SHOCK WITH ASSIST COIL DEVICE, APPARATUS, SYSTEM AND METHOD

(71) Applicant: Arnott T&P Holding, LLC, Merritt Island, FL (US)

(72) Inventors: Adam M. Arnott, Windermere, FL (US); Matt Edward Kirar, Merritt Island, FL (US)

(73) Assignee: Arnott T&P Holding, LLC, Merritt Island, FL (US)

( * ) Notice: Subject to any disclaimer, the term of this patent is extended or adjusted under 35 U.S.C. 154(b) by 0 days.

(21) Appl. No.: 15/007,785

(22) Filed: Jan. 27, 2016

Related U.S. Application Data (63) Continuation-in-part of application No. 14/988,342, filed on Jan. 5, 2016, which is a continuation-in-part of application No. 14/966,678, filed on Dec. 11, 2015.

(51) Int. Cl.
| | |
|---|---|
| *B60G 17/08* | (2006.01) |
| *B60G 15/06* | (2006.01) |
| *B60G 17/02* | (2006.01) |

(52) U.S. Cl.
CPC ......... *B60G 15/061* (2013.01); *B60G 17/021* (2013.01); *B60G 17/08* (2013.01); *B60G 2202/312* (2013.01); *B60G 2202/314* (2013.01); *B60G 2500/201* (2013.01); *B60G 2500/30* (2013.01)

(58) Field of Classification Search
CPC ...... B60G 11/56; B60G 11/58; B60G 15/061; B60G 15/06; B60G 15/062; B60G 15/065; B60G 17/021; B60G 17/0521; B60G 17/08; B60G 2500/30; B60G 2500/201; B60G 2202/314; B60G 2202/312
See application file for complete search history.

(56) References Cited

U.S. PATENT DOCUMENTS

| | | |
|---|---|---|
| 2,324,058 A | 7/1943 | Boor |
| 2,571,279 A | 10/1951 | Myklestad |
| 2,856,035 A | 10/1958 | Rohacs |
| 3,024,875 A | 3/1962 | Stultz |
| 4,560,042 A | 12/1985 | Sell |
| 4,566,565 A | 1/1986 | Wicke |

(Continued)

*Primary Examiner* — Drew J Brown
(74) *Attorney, Agent, or Firm* — Brian S. Steinberger; Law Offices of Brian S. Steinberger, P.A.

(57) ABSTRACT

Single adjustable air suspension shocks with built-in damper device and coil assist, apparatus, system and method for motor vehicles, such as automobiles, vans, trucks, off the road vehicles, and the like. Air suspension systems, devices, apparatus, and methods for allowing motor vehicle drivers to increase and decrease compressed air supplies in air suspension devices. Deflating interior air springs/airbags (bladders) inside the devices allows for springs and pistons on shock absorbers in the devices to expand outward separating lower front and rear frame portions which effectively lowers the motor vehicle to the ground surface and for the driver to have a firmer ride. Inflating the air springs/airbags (bladders) allows for the springs and the pistons on the shock absorbers in the devices to retract into the devices so that the devices have a more shock absorbing effect giving the driver and passenger(s) a smoother ride, which also raises the motor vehicles above the ground surface.

22 Claims, 10 Drawing Sheets

(56) References Cited

U.S. PATENT DOCUMENTS

| | | | |
|---|---|---|---|
| 4,664,234 A | 5/1987 | Wight | |
| 5,172,794 A | 12/1992 | Ward | |
| 5,458,219 A | 10/1995 | Anderson | |
| 5,833,036 A | 11/1998 | Gillespie | |
| 6,193,005 B1 | 2/2001 | Jurrens | |
| 6,244,398 B1 | 6/2001 | Girvin | |
| 6,357,546 B1 | 3/2002 | Crosby | |
| 6,374,966 B1 | 4/2002 | Lillbacka | |
| 6,648,309 B2 | 11/2003 | Beck | |
| 7,011,174 B1 | 3/2006 | James | |
| 7,546,894 B1 | 6/2009 | Glenn | |
| 7,559,396 B2 | 7/2009 | Schwindt | |
| 7,798,295 B2 | 9/2010 | Jurrens | |
| 7,954,792 B2* | 6/2011 | Adonakis | B60G 3/20 267/221 |
| 8,113,322 B2 | 2/2012 | Arnott | |
| 8,256,749 B2* | 9/2012 | Adonakis | B60G 3/20 267/221 |
| 8,292,306 B1 | 10/2012 | Arnott | |
| 2004/0245746 A1 | 12/2004 | Chamberlain | |
| 2009/0206530 A1 | 8/2009 | Arnott | |
| 2010/0117320 A1* | 5/2010 | Grozev | B60G 11/58 280/124.16 |
| 2010/0200343 A1* | 8/2010 | Kondo | B60G 13/02 188/267 |
| 2014/0077466 A1 | 3/2014 | Murakami et al. | |
| 2014/0239602 A1* | 8/2014 | Blankenship | B60G 17/0152 280/5.515 |
| 2016/0075204 A1* | 3/2016 | Marking | F16F 9/062 267/225 |

\* cited by examiner

MOTOR VEHICLE SHOCK WITH ASSIST COIL DEVICE, APPARATUS, SYSTEM AND METHOD

CROSS REFERENCE TO RELATED APPLICATION

This application is a Continuation In Part of U.S. patent application Ser. No. 14/988,342 filed Jan. 5, 2016, which is a Continuation In Part of U.S. patent application Ser. No. 14/966,678 filed Dec. 11, 2015. The entire disclosure of each of the applications listed in this paragraph are incorporated herein by specific reference thereto.

FIELD OF INVENTION

This invention relates to air suspension and dampers, in particular to single adjustable air suspension shocks with built-in damper device and coil assist, apparatus, system and method for motor vehicles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, some types of motor vehicles are known to have harsh rides that are not comfortable for many riders such as the elderly, overweight individuals, and women.

Current springs used in motor vehicles can be progressive in that their lifespan and use deteriorate over time. For example, as the spring compresses, the spring weakens over time, making the ride less desirable for the riders.

Conventional air suspension systems often result in non-smooth and uncomfortable rides, coupled with undesirable vehicle ride performance.

Various types of air suspension systems have been proposed over the years. U.S. Pat. No. 6,648,309 to Beck describes a piston rod with low/high pressure chambers. U.S. Pat. No. 6,374,966 to Lillbacka describes a piston rod that moves within the chamber and is surrounded by an outer chamber with sealing gaskets. An o-ring seals isolate compartment from environment outside of shock absorber; compressible fluid in inner chamber; coil spring provided about piston rod; air inlet, a fluid, i.e. air, pumped into elastomeric tube so that the inflated elastomeric tube acts as air spring to enhance shock absorbing ability of shock absorber.

U.S. Pat. No. 6,244,398 to Girvin describes a shock absorber with a shaft that extends into a reservoir housing which includes a hydraulic reservoir and gas chamber. The chamber seal includes an o-ring to separate the gas chamber from the hydraulic reservoir. There are springs on the shaft, a piston, and shim washers at the end of the piston, a reservoir cap, reservoir seal, and a bumper.

U.S. Pat. No. 5,833,036 to Gillespie describes an airbag in a reservoir of a cylinder, a piston assembly disposed within an inner cylinder and mounted to a piston rod. The piston rod comprising of piston assembly piston, check valve, a seal ring, seal ring carrier, bypass spring, spring abutment plate, and an end outer cylinder sealed plate with threaded mounting member.

U.S. Pat. No. 5,458,219 to Anderson describes a piston; reservoir containing gas cells. U.S. Pat. No. 5,172,794 to Ward describes a gas bag; piston assembly disposed within inner cylinder; piston rod that moves within piston assembly and extends into rebound chamber; outer cylinder with end cap; seal ring; ring; spring; and an end cap.

U.S. Pat. No. 4,664,234 to Wight; U.S. Pat. No. 4,566,565 to Wicke et al.; and U.S. Pat. No. 4,560,042 to Sell et al.; each describe self pressurized dampers. U.S. Pat. No. 3,024,875 to Stultz describes a shock absorber. U.S. Pat. No. 2,571,279 to Nils O. Mykestad describes a cylinder that defines a fluid reservoir containing a sack where air is introduced to a piston rod with sealing means and springs bear against it. And U.S. Pat. No. 2,324,058 to A. Boor et al. describes a hydraulic shock absorber structure.

U.S. Pat. No. 8,113,322 to Arnott, which has the same assignee as the subject invention, which is incorporated by reference in its' entirety, describes a motorcycle air suspension system and method that requires the use of two identical air suspension devices 1, FIG. 14 mounted side by side to provide adjustable air suspension control.

Combining both liquid damping with the air shock generally requires extra seals to keep fluid from leaking out of the housing and also contaminating the air suspension components in the same housing. As such, there can be reliability issues by combining both air suspension and the liquid damping effects in the same housing.

The prior art discloses various types of air suspension systems and their respective components. However, none of the cited references overcomes the problems with the prior art described above. More particularly none of the prior art describes an easily adjustable system for use with motor vehicles that allows the rider to have an adjustable ride based on the air suspension cylinders, with a coil assist spring.

Thus, the need exists for solutions to the above problems with the prior art.

SUMMARY OF THE INVENTION

A primary objective of the present invention is to provide adjustable air suspension shock with built-in damper and coil assist, system, device, apparatus, and method for motor vehicles which is less expensive (lower cost) than existing air shocks with damping capability.

A secondary objective of the present invention is to provide adjustable air suspension shock with built-in damper and coil assist system, device, apparatus, and method for motor vehicles which have less friction than existing air shocks with damping capability.

A third objective of the present invention is to provide adjustable air suspension shock with built-in damper and coil assist system, device, apparatus, and method for motor vehicles which uses less parts than existing air shocks with damping capability.

A fourth objective of the present invention is to provide adjustable air suspension shock with built-in damper and coil assist system, device, apparatus, and method for motor vehicles which eliminates lipped seals with a damper case and reduces or eliminates leaky air seals, than existing air shocks with damping capability.

A fifth objective of the present invention is to provide adjustable air suspension shock with built-in damper and coil assist system, device, apparatus, and method for motor vehicles which is more reliable than existing air shocks with damping capability.

A sixth objective of the present invention is to provide adjustable air suspension shock with built-in damper and coil assist system, device, apparatus, and method for motor vehicles to adjust the suspension to accommodate their personal weight as well as any cargo weight with a smoother ride base on a smoother and comfortable ride with suspension, adjustable suspension height, and adjustable suspension stiffness.

A seventh objective of the present invention is to provide adjustable air suspension shock with built-in damper and coil assist system, device, apparatus, and method for motor vehicles so that an increase of air will stiffen the ride and raise the suspension, while a release of air will soften the ride and lower the suspension.

An eighth objective of the present invention is to provide adjustable air suspension shock with built-in damper and coil assist system, device, apparatus, and method for motor vehicles to allow the shock absorber(s) to act as an extendable and retractable rod to lower or raise the vehicle.

A ninth objective of the present invention is to provide adjustable air suspension shock with built-in damper and coil assist system, device, apparatus, and method for motor vehicles where tuning air suspension is done to individual tastes and usually reduced to a few minutes via onboard adjustability.

A tenth objective of the present invention is to provide adjustable air suspension shock with built-in damper and coil assist system, device, apparatus, and method for motor vehicles where air suspension can be instantly set to specific driving conditions, resulting in improved drive handling.

An eleventh objective of the present invention is to provide adjustable air suspension shock with built-in damper and coil assist system, device, apparatus, and method for motor vehicles where adjustability can be customized between various settings that are smooth and comfortable, firm and rigid, or somewhere in the middle. Motor vehicle rider performance can be based on the driver's desired settings, with existing components on the motorcycle.

A twelfth objective of the present invention is to provide adjustable air suspension shock with built-in damper and coil assist system, device, apparatus, and method for motor vehicles where adjustability can be based on the riders height, weight, desired ride comfort levels, and other customizations.

The novel air shock includes an air bag (rolling diaphragm) air shock, which includes the addition of a coil helper spring for application with each tire/wheel assembly in a motor vehicle. The helper spring helps extend the shock so that the required air pressure in the air bag can be lower to support a given load. Unlike shocks that combine air and a spring together, there are none that use an air bag coupled with a spring. Some shocks use a lipped seal that seals against the damper case. Those designs have much more friction in the system & are prone to leaky air seals. The invention design does not have those problems.

Unlike factory installed air suspension shocks, the invention allows the user to raise or lower the rear shocks through the full range of the suspension travel. This gives the motor vehicle rider the flexibility of setting the height of the rear suspension based on the rider's weight, height, and preference, helping ensure both safety and comfort through enhanced control and stability.

The invention can be manufactured to be used in motorized or non-motorized vehicles. This invention uses an inflatable air spring or rubber/elastomeric airbag/bladder, a shock absorber, a coil spring along with an hydraulic damper.

The benefits of this invention are a smoother suspension, adjustable suspension height, and adjustable suspension stiffness. A practical application of this invention would be on any motorcycle configuration as well as on other vehicles. The end user of the product can adjust the suspension to accommodate their personal weight as well as any cargo weight. This adjustability of the suspension is what improves the ride characteristics of the motorcycle for each individual user.

Conventional, stock, and after-market suspension are preset to a specific maximum weight accommodation level. This preset suspension does not always provide the best ride or handling. The invention allows the user to adjust the suspension levels of the vehicle according to their preference. By allowing the user to adjust the suspension level, the adjustable invention provides a comfortable ride in the motor vehicle which in turn provides a more enjoyable ride experience. The suspension will absorb the right amount of shock or energy to prevent jerky handling, and adjusting the invention to the appropriate setting will allow the vehicle to handle safer than with a conventional or stock suspension. Air is pumped into and fills the air spring/airbag/bladder, which enables this adjustability; an increase of air will stiffen the ride and raise the suspension, while a release of air will soften the ride and lower the suspension.

The coil spring may or may not be used in some assemblies. Acting as a lift helper, the coil spring is used to decrease the amount of air pressure that would be needed to lift a load. It keeps the vehicle at a somewhat standard level, so that adjusting the lift level is not entirely dependent upon air pressure. In fact, with this invention, a minimal amount of air pressure is needed.

The invention combines a shock absorber with inflatable air spring/airbag/bladder and spring along with O-rings and other components.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

This application is a Continuation In Part of U.S. patent application Ser. No. 14/988,342 filed Jan. 5, 2016, which is a Continuation In Part of U.S. patent application Ser. No. 14/966,678 filed Dec. 11, 2015. The entire disclosure of each of the applications listed in this paragraph are incorporated herein by specific reference thereto.

A list of the components will now be described.
10 Shock device with assist coil.
20 Fixed end ring attachment
30 Reciprocating end ring attachment.
40 Reciprocating damper assembly.
50 Air bag can.
60 Compressed air inlet.
70 Fixed end attachment point on motor vehicle.
80 Reciprocating end attachment point on lower suspension arm
90 Motor vehicle having shock and coil assist installed.
100 Air suspension control mounted inside of motor vehicle.
105 driver seat space
110 Battery
120 Air compressor.
130 Motor vehicle rear wheel/tire assembly
140 Pivoting lower suspension arm
145 Pivoting upper suspension arm
150 Pivot axis for lower suspension arm
160 Motor vehicle frame.
170 Control button adds compressed air to each shock assembly and lifts the motor vehicle.
180 Set button can lock the compressed air valve after the selected pressure is attained.
190 Air gauge shows air pressure in each shock assembly.
200 Control button bleeds compressed air from each shock assembly and drops the motor vehicle.
210 Control lines from air suspension control.
215 compressed air lines to each air shock with assist coil
220 damper assembly
222 Damper piston shaft.
223 Damper piston.
224 Damper cylinder.
227 inner step
228 Bumper
229 shaft O-ring in Groove
230 Air Bag.
240A Upper Crimp ring.
240B Lower Crimp ring.
250 Coil spring.
255 Top of shock assembly.
260 External thread on top of shock.
267 Second inside step
270 Internal thread on air bag can.
280 Piston sleeve. Fits over purchased damper assembly.
284 Spring seat/shelf
285 Groove in damper assembly for retaining ring.
290 Retaining ring. Fits into groove on purchased damper assembly to secure piston sleeve.
300 O-ring seals.
310 Set screw. Threads into top of shock and secures rod end of damper assembly.
320 Road surface.

Figures 1, 1A, 1B:
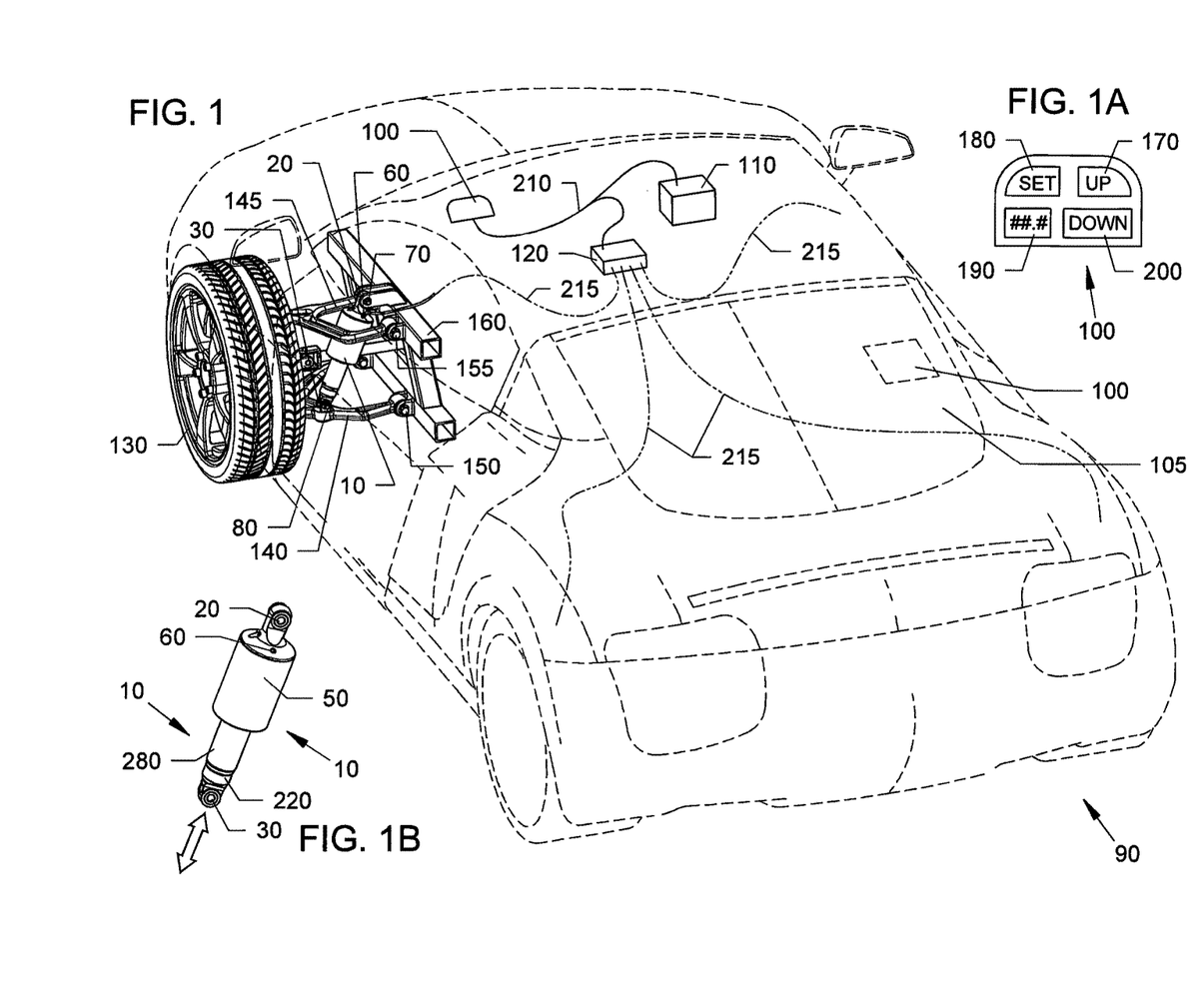
FIG. 1 is a perspective view of motor vehicle with adjustable air shock device with built-in damper and coil assist mounted to each of the four wheels.
FIG. 1A is an enlarged view of a control panel shown in FIG. 1.
FIG. 1B is a perspective view of the adjustable air shock device with built-in damper and coil assist from FIG. 1.

FIG. 1 is a perspective view of a motor vehicle 90 with adjustable air shock device 10 with built-in damper and coil assist mounted to each of the four wheels 130. FIG. 1A is an enlarged view of a steering wheel control panel 100 shown in FIG. 1, which can control air bag 230 inflation and deflation in each air shock 10.

FIG. 1B is a perspective view of the adjustable air shock device 10 with built-in damper and coil assist from FIG. 1.

Figure 2:
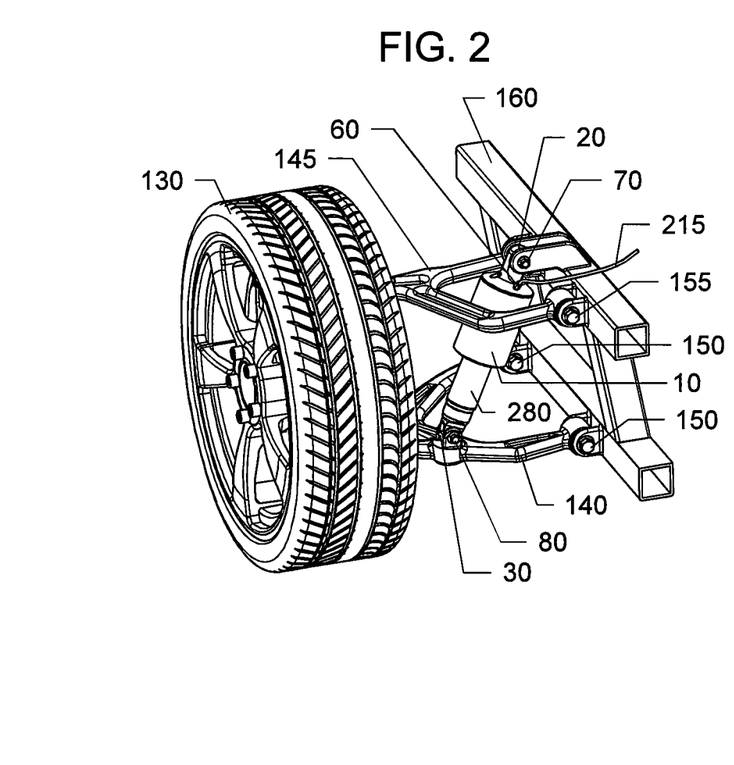
FIG. 2 is an enlarged perspective view of the air shock device with damper and coil assist of FIG. 1 and FIG. 1B with reciprocating piston assembly extended.
Figure 3:
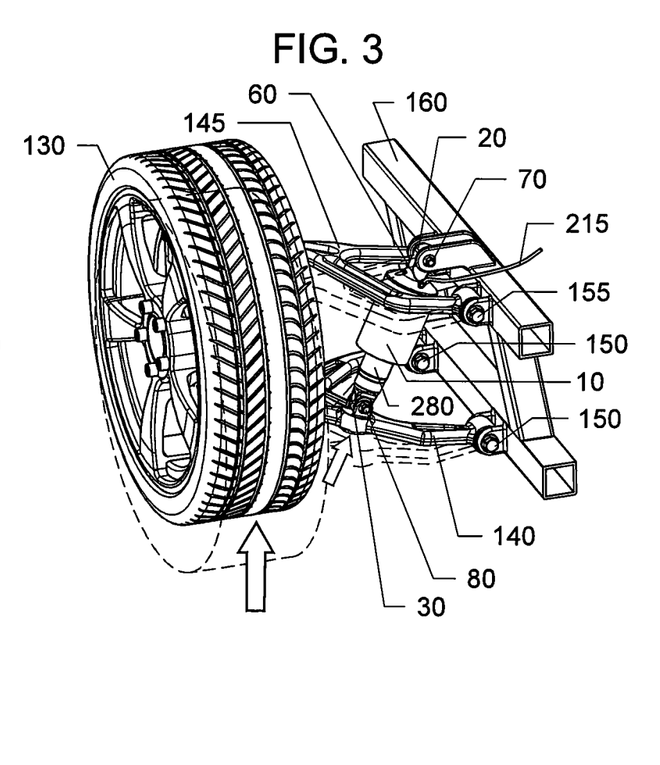
FIG. 3 is another view of the air shock device with damper and coil assist of FIG. 2 with reciprocating piston assembly compressed.
Figure 4:
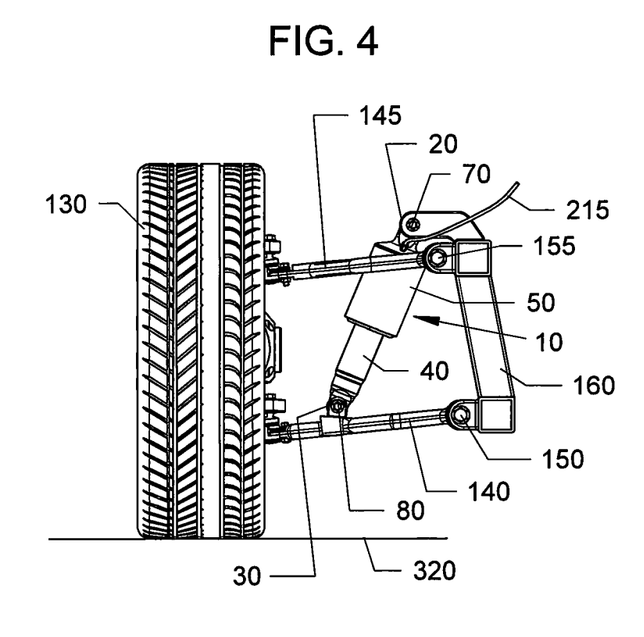
FIG. 4 is a front view of the air shock device with damper and coil assist of FIG. 2 with reciprocating piston assembly extended.
Figure 5:
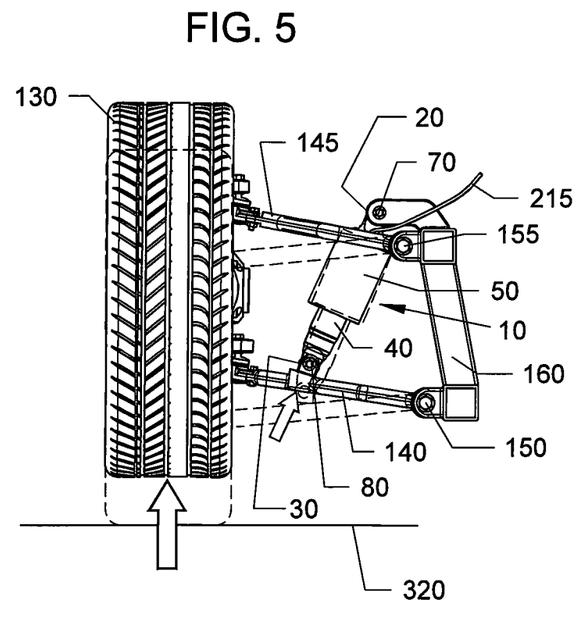
FIG. 5 is a front view of the air shock device with damper and coil assist of FIG. 3 with reciprocating piston assembly compressed.

FIG. 2 is an enlarged perspective view of the air shock device 10 with damper and coil assist of FIG. 1 and FIG. 1B with reciprocating piston assembly 40 extended. FIG. 3 is another view of the air shock device 10 with damper and coil assist of FIG. 2 with reciprocating piston assembly 40 compressed. FIG. 4 is a front view of the air shock device 10 with damper and coil assist of FIG. 2 with reciprocating piston assembly 40 extended. FIG. 5 is a front view of the air shock device with damper and coil assist of FIG. 3 with reciprocating piston assembly compressed.

Figure 6:
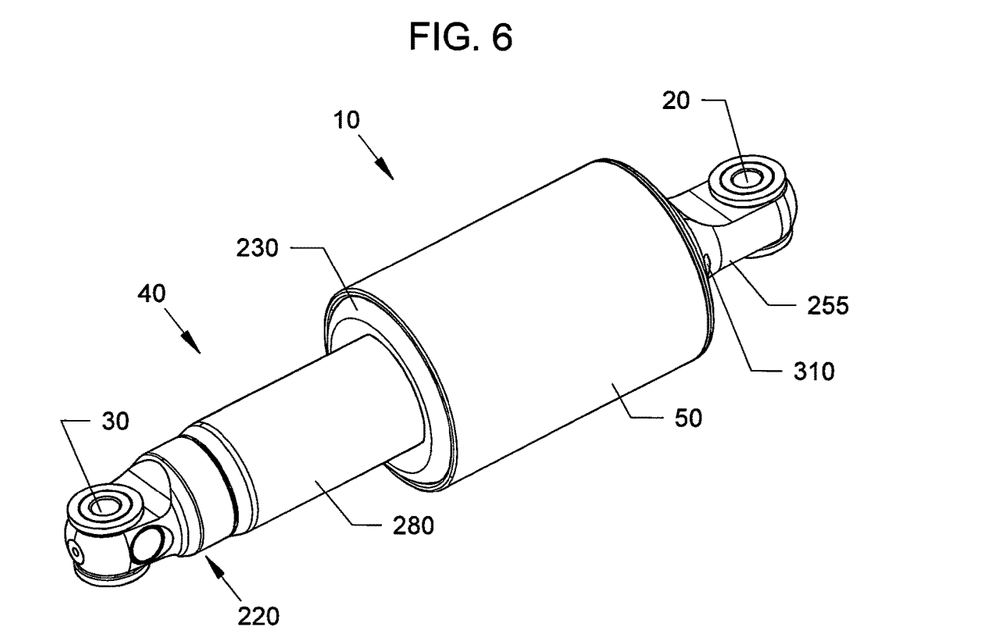
FIG. 6 is a top perspective view of the adjustable air shock device with built-in damper and coil assist assembly of FIGS. 1, 1B, 2 and 4 with reciprocating piston assembly extended.

FIG. 6 is a top perspective view of the adjustable air shock device 10 built-in damper and coil assist assembly of FIGS. 1, 1B, 2 and 4 with reciprocating piston assembly 40 extended.

Figure 7:
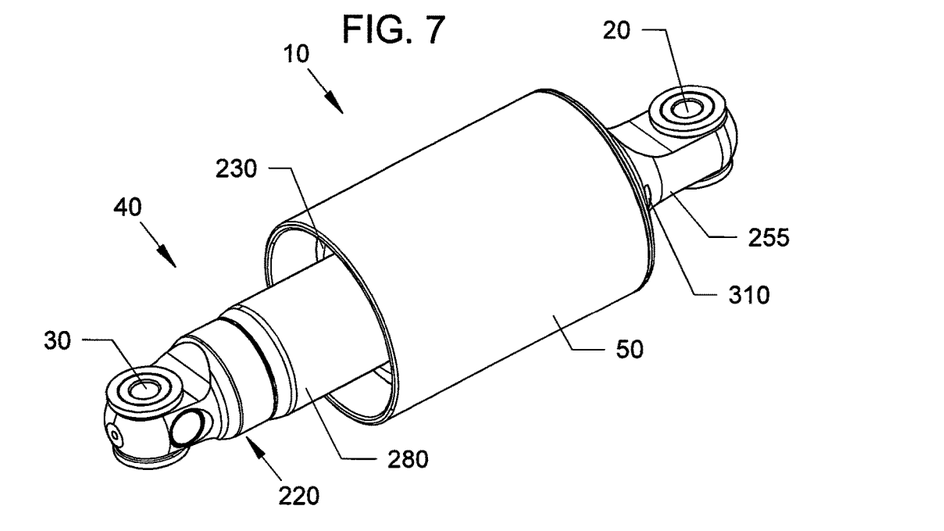
FIG. 7 is another top perspective view of the assembly of FIGS. 1, 1B, 3 and 5 with damper/spring/air spring compressed.
Figure 8:
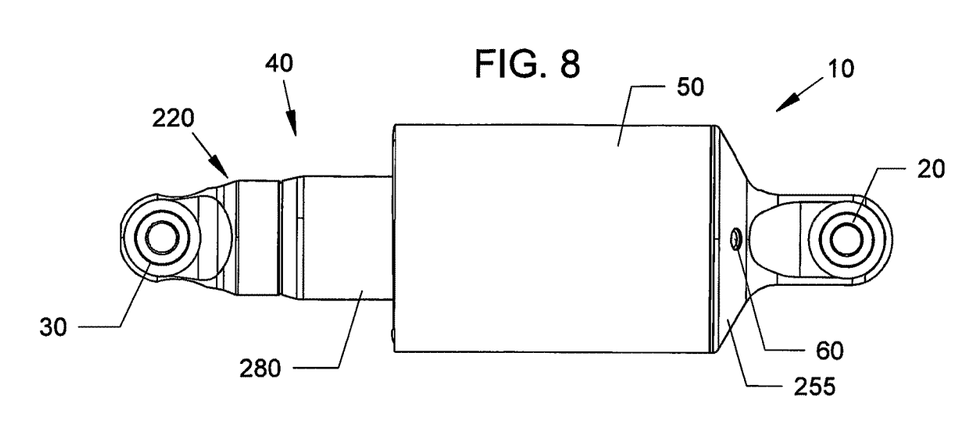
FIG. 8 is a top view of the shock assembly of FIG. 7.
Figure 9:
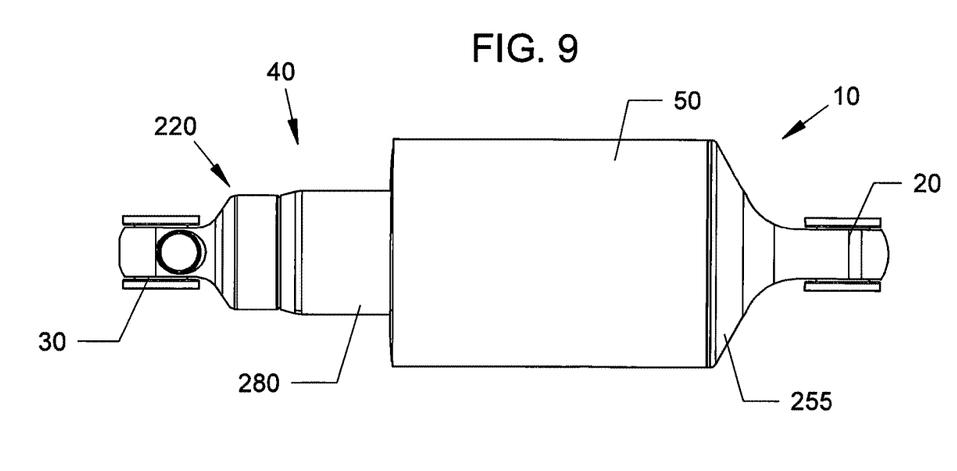
FIG. 9 is a front view of the shock assembly of FIG. 8.
Figure 10:
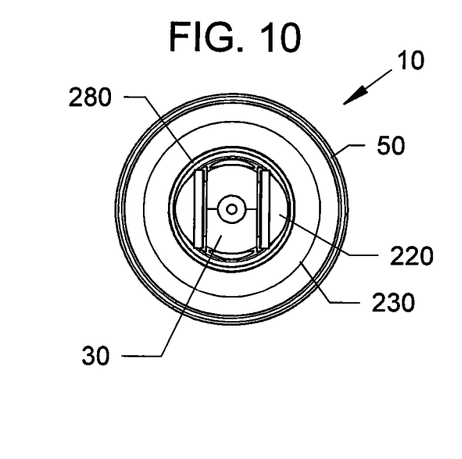
FIG. 10 is a left end view of the shock assembly of FIG. 7.
Figure 11:
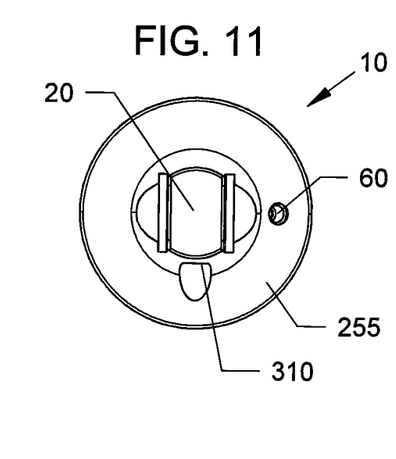
FIG. 11 is a right end view of the shock assembly of FIG. 7.

FIG. 7 is another top perspective view of the device 10 of FIGS. 1, 1B, 3 and 5 with damper piston assembly 40 compressed. FIG. 8 is a top view of the shock 10 with piston assembly of FIG. 7. FIG. 9 is a front view of the shock 10 with piston assembly 40 of FIG. 8. FIG. 10 is a left end view of the shock 10 with piston assembly 40 of FIG. 7. FIG. 11 is a right end view of the shock 10 with piston assembly 40 of FIG. 7.

Figure 12A:
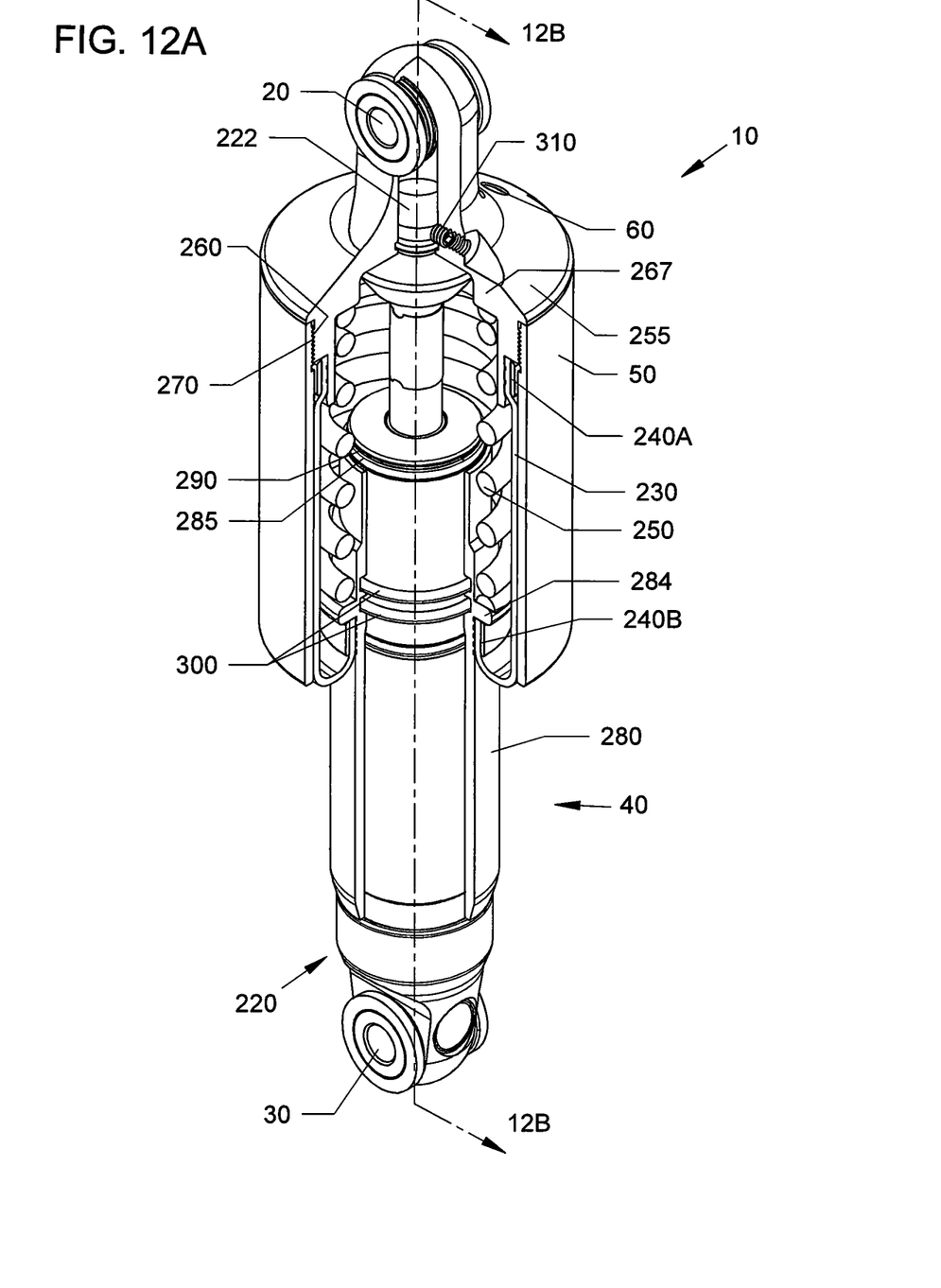
FIG. 12A is a partial cross-sectional perspective view of the FIGS. 2, 4 and 6 shock assembly with damper/helper spring/air spring assembly extended.
Figure 12B:
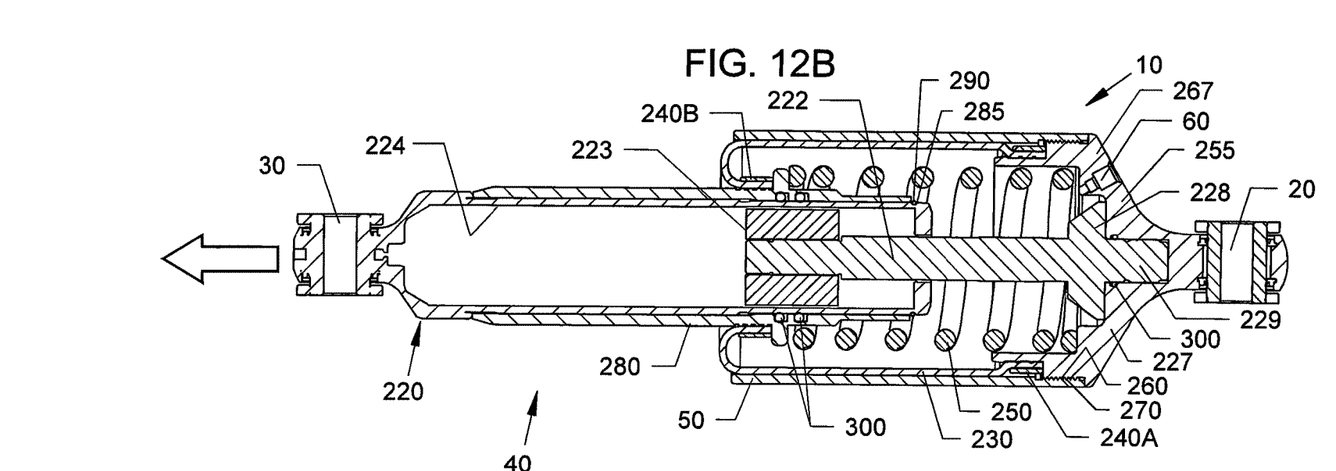
FIG. 12B is a cross-sectional view of the shock assembly with extended assembly of FIG. 12A along arrows 12B.

FIG. 12A is a partial cross-sectional perspective view of the FIGS. 2, 4 and 6 shock device 10 with damper/helper spring/air spring piston assembly 40 extended. FIG. 12B is a cross-sectional view of the shock device 10 with extended piston assembly 40 of FIG. 12A along arrows 12B.

Figure 13A:
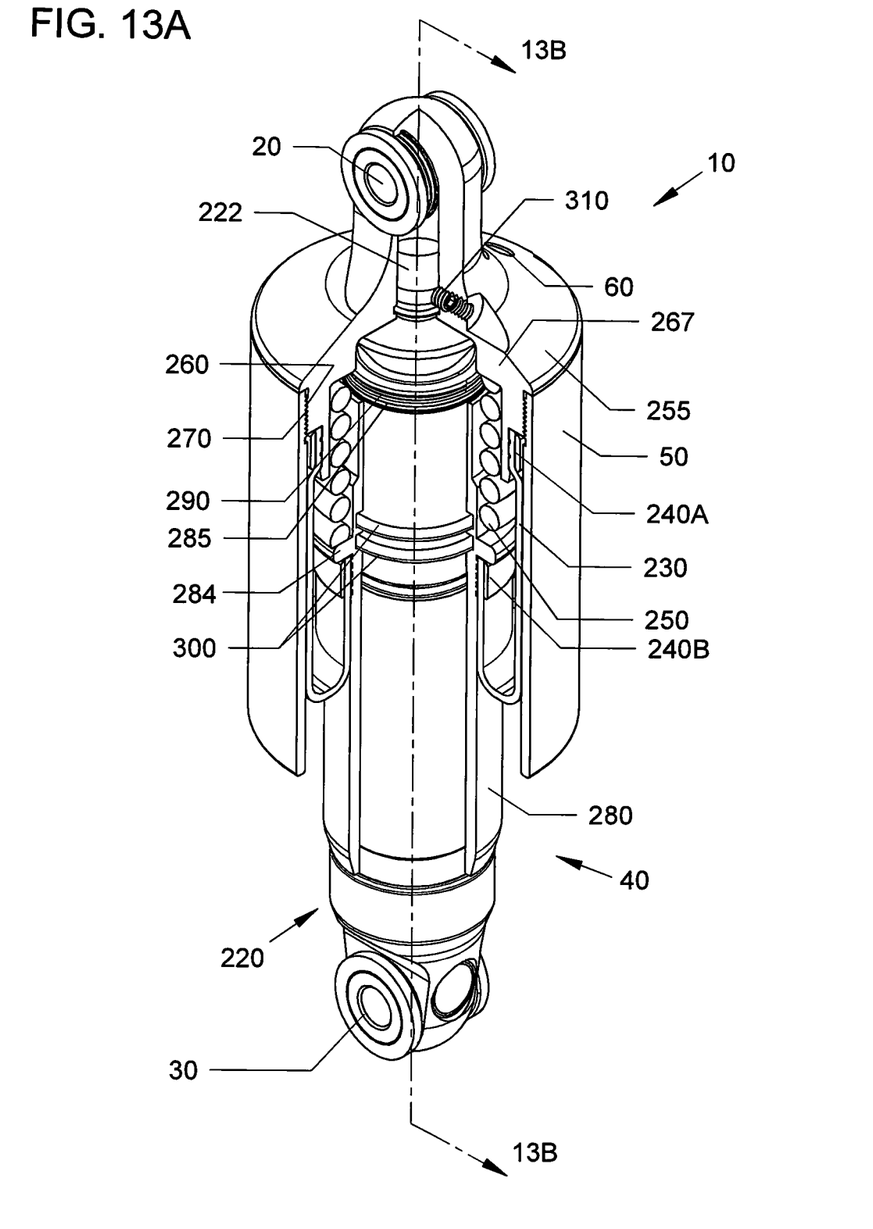
FIG. 13A is a partial cross-sectional perspective view of the FIG. 4 shock assembly with damper/helper spring/air spring assembly compressed.
Figure 13B:
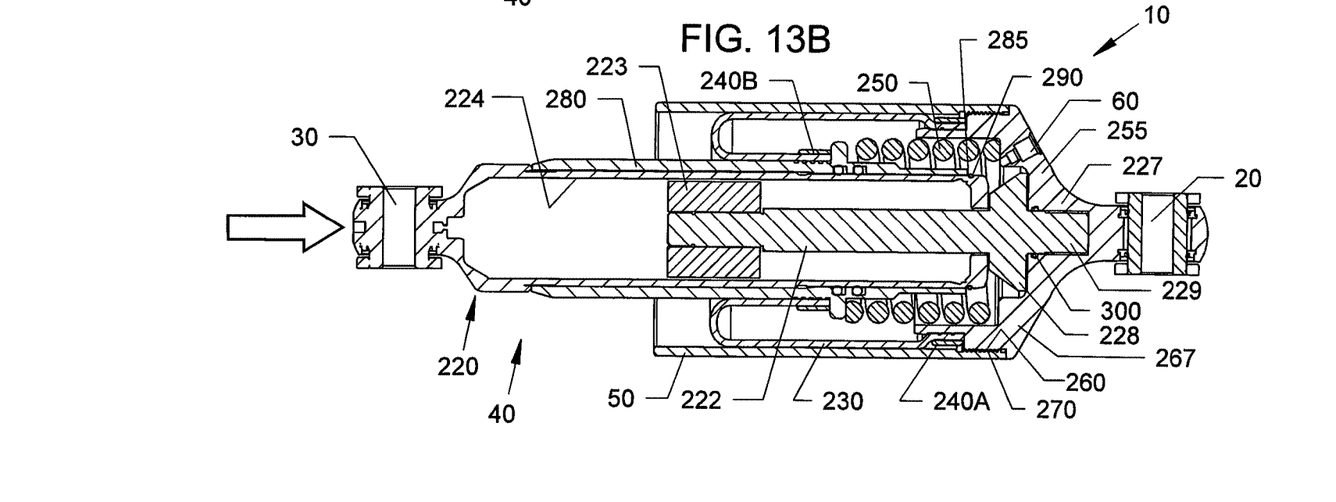
FIG. 13B is a cross-sectional view of the shock assembly with the compressed w damper/helper spring/air spring assembly of FIG. 13A along arrows 13B.

FIG. 13A is a partial cross-sectional perspective view of the FIG. 4 shock device 10 with damper/helper spring/air spring piston assembly 40 compressed. FIG. 13B is a cross-sectional view of the shock device 10 with the compressed w damper/helper spring/air spring piston assembly 40 of FIG. 13A along arrows 13B.

Figure 14:
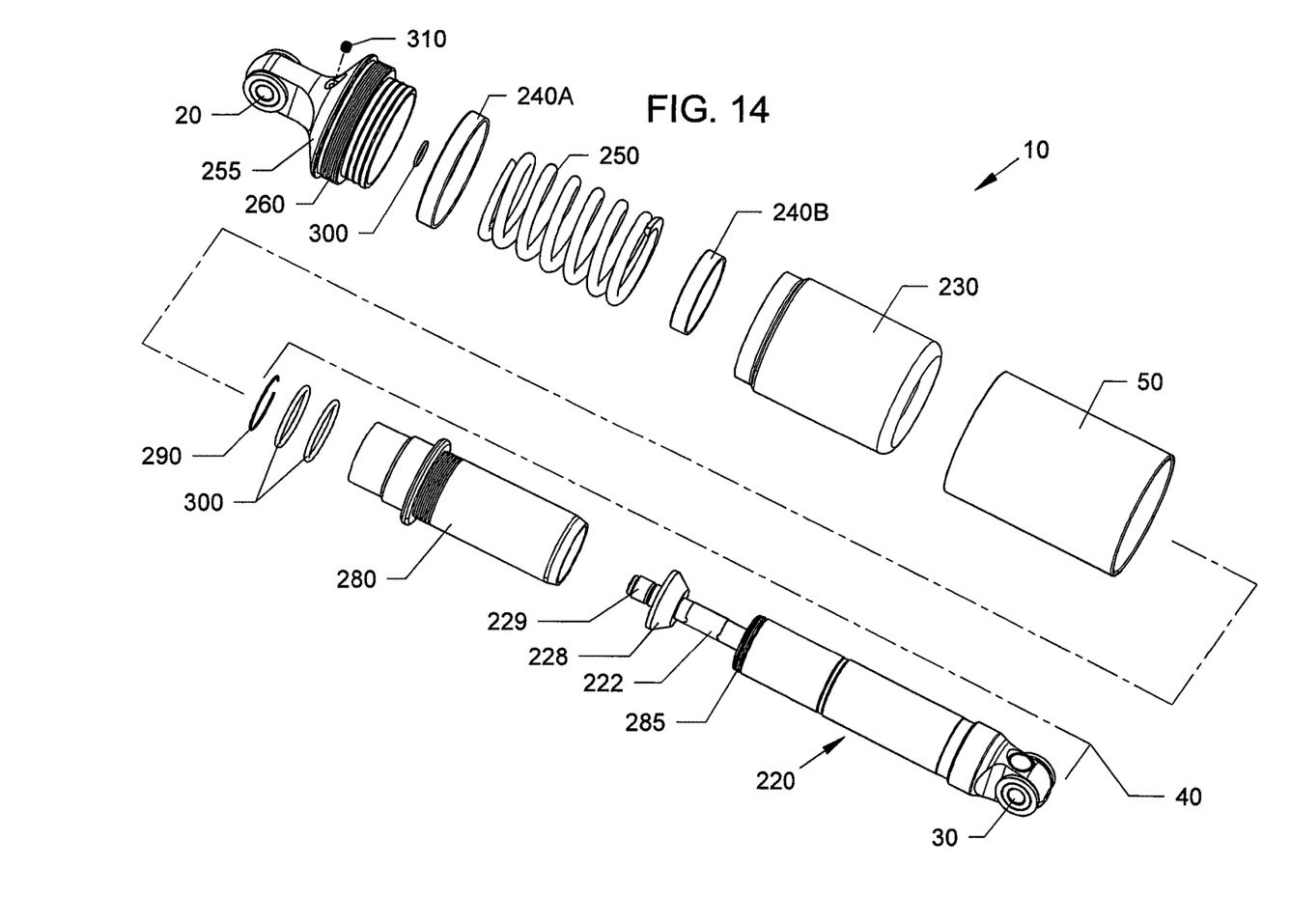
FIG. 14 is an exploded perspective view of the adjustable air shock device with built-in damper and coil assist shown in the preceding figures.

FIG. 14 is an exploded perspective view of the adjustable air shock device 10 with built-in damper and coil assist and piston assembly 40 shown in the preceding figures.

Referring to FIGS. 1, 1B and 2-14, each shock device 10 with assist coil 250, can include a fixed end ring attachment 20 which can pivotally attach to an upper fixed end attachment point 70 on an upper end of a vehicle frame 160 adjacent to each wheel/tire assembly 130 on a motor vehicle frame 90.

Each shock device 10 with assist coil 250 can have an opposite end with reciprocating end ring attachment 30 attached to a reciprocating end attachment point 80 on a pivoting lower suspension arm 140 attached between the wheel frame 140 and the wheel/tire assembly 130, where the lower suspension arm 140 can pivot relative to a pivot axis 150 point on the rear frame 140.

Each air shock device 10 with assist coil 250 can include a top 255 with a compressed air inlet 60 with an air bag can 50 having a cylindrical shape. The air bag can 50 being threadably attached to the top 255 by external thread 260 and internal thread 270 (FIGS. 12A, 13A). An upper end of the damper piston shaft 222 can be held inside of top 255 by a set screw 310 that screws into side O-ring 229 in groove 255, with O-ring seals 300 sealing about the upper end of the shaft 222 while an enlarged end of 228 is about the piston shaft 222 abuts against an inner step 227 inside the top 225.

A lower end of damper piston shaft 222 can include a damper piston 223 with a larger diameter than the shaft 222. Damper piston 223 allows for damper cylinder 224 which is part of damper assembly 220 to slide up and down relative to the damper piston 223. Damper assembly 220 with the reciprocating piston shaft 222, that can function as a hydraulic shock absorber, such as, but not limited to the hydraulic shock absorber shown and described in U.S. Pat. No. 2,856,035 to Rohacs, which is incorporated by reference.

Inside each air bag can 50 can include an air bag 230 having an upper end held in place by a crimp ring 240A against an upper inner wall of the air bag can 50. The air bag 230 can have a lower end held in place by another crimp ring 240B locked about an upper portion of piston sleeve 280.

A coil spring 250 can have an upper end abutting against a second step 267 inside the top 255 of the shock device 10. Coil spring 250 can have a lower end that abuts against an upper surface of shelf 284. which extends outward from piston sleeve 280. A retaining ring 290 in groove 285 and additional seals 300 allow for sealing the air chamber.

Referring to FIGS. 1-14, a control panel 100 can be mounted within reach of a driver seat 105 inside of the motor vehicle 90, with a battery 110 powering an air compressor 120 mounted on the motorcycle 90.

Air lines 2150 can be attached between the air compressor 120 and the air inlet 60 on each shock device 10, and allows air to be injected into the air inlet 60 into the interior chamber inside each air bag 230 inside of each air bag can 50 in the shock devices located adjacent to each wheel/tire assembly 130

On the panel 100, switches 170, 200 can be push button switches which either add compressed air simultaneously to each air shock assembly 10 by depressing button 170, or remove air simultaneously from each air shock assembly 10 by pressing on button 200.

Control button 170 adds compressed air to each air bag 250 in each shock device 10 and can lift the motor vehicle 90 relative to the road surface 320. Control button 200 when pressed can bleed compressed air from air bag 230 in shock device 10 which results in dropping the motor vehicle 90 to the road surface 320.

Set button 180 can lock the compressed air valve in each air shock 10 after the selected pressure in the air bag 230 is reached.

Air gauge 190 displays air pressure in PSI inside the shock devices 10.

The depressible buttons 170, 200 allow for instant inflation and deflation of the airbag (air bladder) 230 within the air shock assembly 10, and allow the driver to achieve desired operating conditions of the air shock assembly 10 in seconds.

The air shock assembly 10 can operate similar to the combined air suspension device 1, shown and described in U.S. Pat. No. 8,113,322 to Arnott, which is incorporated by reference in its' entirety.

Here, an operating gauge 190 can show in real-time the pressure of compressed air in air shock assembly 10, which can run from approximately 0 PSI (pounds per square inch) for minimum pressure level to as much as approximately 250 PSI for maximum pressure loads. A set button 180 can be preset to different pressure levels so that the operator can immediately depress to various pre-programmed pressure states for settings such as but not limited to states that are smooth and comfortable, firm and rigid, or somewhere in the middle. The driver can further make adjustments to the air suspension devices 1 based on their height, weight, and any other customized conditions as desired.

Referring to FIGS. 1, 1A, 12A, 12B, 13A, 13B, as compressed air is pumped into compressed air inlet 60, each airbag 230 expands downward (inflates) within can 50, while allowing spring 250 to naturally expand to a normal coil expanded state. While in a compressed air state with each airbag (bladder) inflated, the more air added, the firmer the ride is for the driver and passenger(s) inside the motor vehicle.

Removing Compressed Air (Deflating Airbag (Bladder))

Referring to FIGS. 1, 1A, 12A, 12B, 13A, 13B as compressed air is released outward from air inlet 60, each airbag 230 retracts (deflates) within airbag can 50, while compressing spring 250 to a compressed state. While in an uncompressed air state with each airbag (bladder) deflated, the more air removed, the smoother the ride is for the driver and passenger(s). The greater amount of shock cushion effect results in a smoother ride.

Although the embodiments show the invention being used on a motor vehicle, such as an automobile, the invention can be used on other motor vehicles, such as but not limited to vans, trucks, four wheel drive vehicles, off the road vehicles, All-terrain vehicles, dune buggies, golf carts, and the like.

While the embodiments show the controls being used on all four wheels to raise and lower the motor vehicle, the controls can be used separately on just the rear wheels, and/or separately on just the front wheels, and other combinations thereof.

Although the embodiments show motor vehicles having four wheels, the invention can be used with motor vehicles having three wheels or five or more wheels.

While the figures show the novel combination of air shock assembly 10 and damper assembly 20 mounted in one arrangement, the air shock assembly 10 and damper assembly 20 can be oppositely mounted to the motor vehicle Although the preferred embodiment shows the air shock device 10 mounted in a vertical orientation, the novel air shock device 10 can be mounted horizontally on motor vehicles where the existing shocks/springs are mounted.

Although the invention describes use of the air shock device 10 with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An adjustable air shock with coil assist for four wheel motor vehicles, comprising:
   an air shock having a housing with closed end and a opposite facing open end;
   a fluid damper having a first end attached inside of the air shock housing adjacent to the closed end, and a second end protruding from the open end of the air shock housing so that the first end and second end move from a retracted position to an extended position relative to the air shock housing, the damper having a damper cylinder;
   a separate sleeve for fitting about the damper cylinder, the sleeve having an outwardly extending shelf,
   a rolling diaphragm having one end attached inside the air shock housing adjacent to the closed end, and another end attached to an-outside of the sleeve; and
   an assist spring inside of the air shock housing positioned between the closed end of the air shock housing and the shelf on the sleeve, wherein the adjustable air shock with coil assist is adaptable to be mounted in a vertical position between a pivoting rear wheel frame and upper fixed rear frame portion on each wheel of a four wheel vehicle.

2. The adjustable air shock with coil assist of claim 1, wherein the rolling diaphragm includes an air bag.

3. The adjustable air shock with coil assist of claim 2, wherein the fluid damper includes a hydraulic fluid damper with reciprocating piston.

4. The adjustable air shock with coil assist of claim 2, wherein the assist coil includes a coil spring wrapped about an upper end portion of the fluid damper.

5. The adjustable air shock with coil assist of claim 4, further including:
   a compressed air source attached to the closed end of the air shock; and
   a control for adjusting compressed fluid levels between the compressed air source and the air shock housing, wherein increasing and inflating compressed fluid levels inside the air shock housing causes rolling diaphragm to retract in and extend out of the air shock housing to increase and decrease.

6. The adjustable air shock with coil assist spring of claim 5, wherein the control includes:
   an increase switch for adding compressed air into the rolling diaphragm; and
   a decrease switch for releasing compressed air from the rolling diaphragm.

7. The adjustable air shock with coil assist of claim 2, further including:
   a compressed air source attached to the closed end of the air shock; and
   a control for adjusting compressed fluid levels between the compressed air source and the air shock housing, wherein increasing and inflating compressed fluid levels inside the air shock housing causes the rolling diaphragm to retract in and extend out of the air shock housing.

8. The adjustable air shock with coil assist spring of claim 7, wherein the control includes:
   an increase switch for adding compressed air into the rolling diaphragm; and
   a decrease switch for releasing compressed air from the rolling diaphragm.

9. The adjustable air shock with coil assist of claim 1, wherein the fluid damper includes a hydraulic fluid damper with reciprocating piston.

10. The adjustable air shock with coil assist of claim 1, wherein the assist coil includes a coil spring wrapped about an upper end portion of the fluid damper.

11. The adjustable air shock with coil assist of claim 1, further including:
    a compressed air source attached to the closed end of the air shock; and
    a control for adjusting compressed fluid levels between the compressed air source and the air shock housing, wherein increasing and inflating compressed fluid levels inside the air shock housing causes the rolling diaphragm to retract in and extend out of the air shock housing.

12. The adjustable air shock with coil assist spring of claim 11, wherein the control includes:
    an increase switch for adding compressed air into the rolling diaphragm; and
    a decrease switch for releasing compressed air from the rolling diaphragm.

13. The adjustable air shock with coil assist of claim 1, wherein the four wheeled motorized vehicle is a motorcycle.

14. The adjustable air shock with coil assist of claim 1, further comprising:
    sealing rings between the separate sleeve and the damper cylinder.

15. A method of providing a shock with a coil assist spring for four wheel motor vehicles, comprising the steps of:
    providing a motor vehicle having a front set of wheels and a rear set of wheels;
    providing a frame for each wheel having a pivoting upper suspension arm and a pivoting lower suspension arm;
    providing an air shock for each wheel, each air shock being in a housing having one end extendable and retractable from the air shock housing, the air shock having a top and a bottom;
    providing a hydraulic damper in each air shock housing, with one end extendable and retractable from the air shock housing, the damper having a damper cylinder;

providing a separate sleeve for fitting about each damper cylinder, the sleeve having an outwardly extending shelf;

mounting a coil assist spring inside of each air shock housing with one end on the shelf the sleeve and an opposite end inside of the air shock; and providing air shock and damping to each wheel of the motor vehicle with each air shock and damper housing having the coil assist spring, with the top of each air shock pivotally attached to the frame and the bottom of each air shock pivotally attached to the pivoting lower suspension arm.

16. The method of claim 15, further comprising the step of:

adjusting compressed fluid levels in each air shock.

17. The method of claim 15, further comprising the step of:

inflating an air bag inside of each air shock housing to raise the motor vehicle over a ground surface.

18. The method of claim 17, further comprising the step of:

deflating each air bag inside of each air shock housing to lower the motor vehicle to the ground surface.

19. The method of claim 18, wherein deflating and the decreasing of compressed fluid levels inside each air shock housing includes the step of:

providing a smoother ride to a driver in the motor vehicle.

20. The method of claim 17, wherein inflating and the increasing of compressed fluid levels inside each air shock housing includes the step of:

providing a firmer ride to a driver in the motor vehicle.

21. The method of claim 15, further comprising the steps of:

providing a rolling diaphragm having one end attached inside each air shock housing adjacent to the closed end, and another end attached to an outside of each sleeve.

22. The method of claim 15, further comprising the steps of:

providing sealing rings between the separate sleeve and the damper cylinder.

* * * * *